US012530191B2

(12) United States Patent
Luna et al.

(10) Patent No.: US 12,530,191 B2
(45) Date of Patent: Jan. 20, 2026

(54) SOFTWARE DEPLOYMENT PIPELINE EVALUATION USING PRESENCE OF DESIGNATED FUNCTIONS

(71) Applicant: Dell Products L.P., Round Rock, TX (US)

(72) Inventors: Raymond Luna, Austin, TX (US); Nathan Michael Cairl, Lago Vista, TX (US); William Cody Taylor, Round Rock, TX (US); Michael R. Reed, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 18/345,375

(22) Filed: Jun. 30, 2023

(65) Prior Publication Data

US 2025/0004756 A1 Jan. 2, 2025

(51) Int. Cl.
*G06F 8/65* (2018.01)
*G06F 8/60* (2018.01)
*G06F 8/61* (2018.01)
*G06F 8/70* (2018.01)
*G06F 8/71* (2018.01)
(Continued)

(52) U.S. Cl.
CPC . *G06F 8/71* (2013.01); *G06F 8/60* (2013.01)

(58) Field of Classification Search
CPC ..... G06F 8/71; G06F 8/60; G06F 8/70; G06F 9/445; G06F 9/45558; G06F 11/3688; G06F 8/36; G06F 9/547; G06F 8/30; G06F 21/56; G06F 8/20; G06F 11/3692; G06F 11/3676; G06F 8/433; G06F 11/3684; G06F 11/3698; G06F 9/5005; G06F 11/3495; G06F 9/48; G06F 9/5038; G06F 8/77;
(Continued)

(56) References Cited

U.S. PATENT DOCUMENTS 11,829,280 B1 * 11/2023 Zhang ................. G06F 11/3692
12,192,273 B1 * 1/2025 Pandurangarao ... H04L 67/1097
(Continued)

OTHER PUBLICATIONS

"A Roadmap to Continuous Delivery Pipeline Maturity"; AWS Marketplace; downloaded on Jun. 28, 2023.
(Continued)

*Primary Examiner* — Thuy Dao
(74) *Attorney, Agent, or Firm* — Ryan, Mason & Lewis, LLP

(57) ABSTRACT

Techniques are provided for software deployment pipeline evaluation using a presence of designated functions. One method comprises obtaining information characterizing a set of designated functions; determining one or more of: (i) whether at least one stage of a given software deployment pipeline comprises one or more of the designated functions in the set and (ii) whether an execution of one or more of the designated functions in the at least one stage of the given software deployment pipeline succeeded; and initiating one or more automated actions based at least in part on at least one result of the determining. The designated functions may be specified for different technology types. Job logs associated with the at least one stage of the given software deployment pipeline may be searched for commands that execute one or more of the designated functions.

20 Claims, 10 Drawing Sheets

(51) Int. Cl.
*G06F 9/445* (2018.01)
*G06F 9/45* (2006.01)

(58) Field of Classification Search
CPC ......... G06F 8/65; G06F 9/5055; G06N 20/00; G06Q 10/06312; G06Q 10/04
See application file for complete search history.

(56) References Cited

U.S. PATENT DOCUMENTS

| | | | |
|---|---|---|---|
| 2020/0133830 A1* | 4/2020 | Sharma | G06F 11/3676 |
| 2022/0300280 A1* | 9/2022 | Rafey | G06F 11/3409 |
| 2022/0327012 A1* | 10/2022 | Roy | G06N 20/20 |
| 2023/0059261 A1* | 2/2023 | Boyapalle | G06F 21/575 |

OTHER PUBLICATIONS

Vlietland, Jan; "Continuous Delivery 3.0 Maturity Model (CD3M)"; https://nisi.nl/continuousdelivery/articles/maturity-model; Jun. 14, 2019.
"DevOps Maturity Model"; https://www.professional-devops.com/devops-maturity-model.html; downloaded on Jun. 28, 2023.

* cited by examiner

| DESIGNATED CI/CD SOFTWARE FUNCTIONS FOR DATABASE TECHNOLOGY TYPE | GENERAL DATABASES | BUSINESS INTELLIGENCE DATABASES |
|---|---|---|
| DEVELOPMENT AND VERIFICATION STAGE | | |
| SOURCE CODE MANAGEMENT FUNCTION | VALIDATE | VALIDATE |
| AUTOMATED CODE BUILD FUNCTION | VALIDATE | VALIDATE |
| AUTOMATED UNIT TESTING FUNCTION | VALIDATE | N/A |
| CODE QUALITY SCAN FUNCTION | VALIDATE | N/A |
| STATIC APPLICATION SECURITY TESTING FUNCTION | VALIDATE | N/A |
| THIRD-PARTY CODE SCAN FUNCTION | N/A | N/A |
| ARTIFACT VULNERABILITY SCAN FUNCTION | N/A | N/A |
| VERIFY-BUILD STAGE GATED FUNCTION | VALIDATE | N/A |
| BUILD ARTIFACTS MANAGED FUNCTION | N/A | N/A |
| ... | | |

| DESIGNATED CI/CD SOFTWARE FUNCTIONS | GENERAL DATABASE APPLICATIONS | BUSINESS INTELLIGENCE DATABASE APPLICATIONS |
|---|---|---|
| NON-PRODUCTION DEPLOYMENT AND VALIDATION STAGE | | |
| AUTOMATED NON-PRODUCTION DEPLOYMENT FUNCTION | VALIDATE | VALIDATE |
| NON-PRODUCTION DEPLOYMENT VALIDATION FUNCTION | VALIDATE | VALIDATE |
| DYNAMIC APPLICATION SCAN FUNCTION | N/A | N/A |
| NON-PRODUCTION DEPLOYMENT VALIDATION STAGE GATED FUNCTION | VALIDATE | VALIDATE |
| ... | | |
| PRODUCTION DEPLOYMENT AND VALIDATION STAGE | | |
| AUTOMATED PRODUCTION DEPLOYMENT FUNCTION | VALIDATE | VALIDATE |
| ZERO DOWNTIME DEPLOYMENT FUNCTION | N/A | N/A |
| PRODUCTION DEPLOYMENT VALIDATION FUNCTION | VALIDATE | VALIDATE |
| PRODUCTION DEPLOYMENT VALIDATION STAGE GATED FUNCTION | VALIDATE | VALIDATE |
| PRODUCTION DEPLOYMENT ARTIFACTS MANAGEMENT FUNCTION | VALIDATE | VALIDATE |
| REQUEST FOR CHANGE AUTOMATED FUNCTION | VALIDATE | VALIDATE |
| ... | | |

FIG. 6B

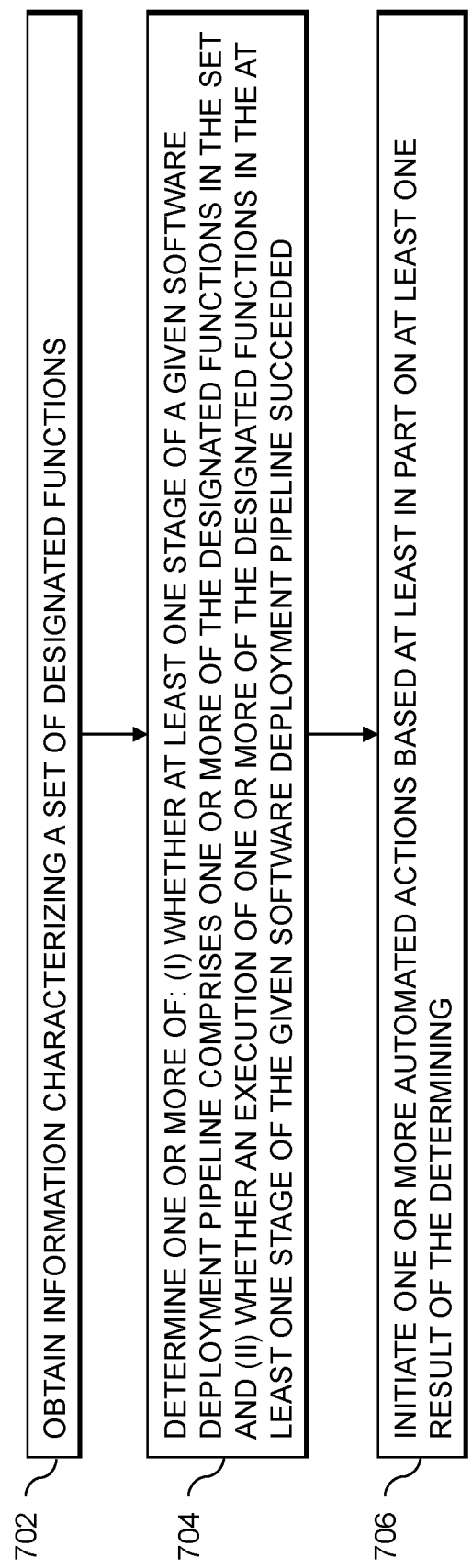

SOFTWARE DEPLOYMENT PIPELINE EVALUATION USING PRESENCE OF DESIGNATED FUNCTIONS

BACKGROUND

A number of techniques exist for developing and evaluating software code. Software development platforms are available, for example, that enable communication and collaboration among software developers. There is an increasing trend for software applications to adopt a microservices architecture. It is often difficult, however, for software developers to identify the portions of a development process for such software applications that need to be improved.

SUMMARY

In one embodiment, a method comprises obtaining information characterizing a set of designated functions; determining one or more of: (i) whether at least one stage of a given software deployment pipeline comprises one or more of the designated functions in the set and (ii) whether an execution of one or more of the designated functions in the at least one stage of the given software deployment pipeline succeeded; and initiating one or more automated actions based at least in part on at least one result of the determining.

In one or more embodiments, the obtaining the information characterizing the set of designated functions comprises identifying a technology type associated with the given software deployment pipeline and wherein the obtained set of designated functions is specified for the identified technology type. The determining whether the at least one stage of the given software deployment pipeline comprises the one or more of the designated functions may comprise searching one or more job logs associated with the at least one stage of the given software deployment pipeline for one or more commands that execute one or more of the designated functions.

In some embodiments, the one or more automated actions may comprise determining a score for the at least one stage of the given software deployment pipeline based at least in part on a number of the set of designated functions found in the at least one stage of the given software deployment pipeline. The one or more automated actions may comprise generating one or more notifications that identify one or more designated functions that one or more of: (i) are missing from the at least one stage of the given software deployment pipeline and (ii) have a failed status for the at least one stage of the given software deployment pipeline.

In at least one embodiment, the set of designated functions for the at least one stage of the given software deployment pipeline may be configured for a given organization. The set of designated functions for the at least one stage of the given software deployment pipeline may comprise one or more recommended functions based on a set of designated practices. An order of the execution of the one or more designated functions may be evaluated in the at least one stage of the given software deployment pipeline. An output of the execution of the one or more designated functions in the at least one stage of the given software deployment pipeline may be reviewed to verify whether the execution of the one or more designated functions succeeded.

Illustrative embodiments can provide significant advantages relative to conventional techniques. For example, technical problems associated with evaluating software deployment pipelines are mitigated in one or more embodiments by determining whether a given software deployment pipeline includes a set of designated functions.

Other illustrative embodiments include, without limitation, apparatus, systems, methods and computer program products comprising processor-readable storage media.

BRIEF DESCRIPTION OF THE DRAWINGS

FIGS. 6A and 6B are sample tables illustrating a set of designated functions for a number of exemplary stages of a representative software deployment pipeline, in accordance with illustrative embodiments;

FIG. 7 is a flow chart illustrating an exemplary process for software deployment pipeline evaluation using a presence of designated functions, in accordance with an illustrative embodiment;

DETAILED DESCRIPTION

Figure 1:
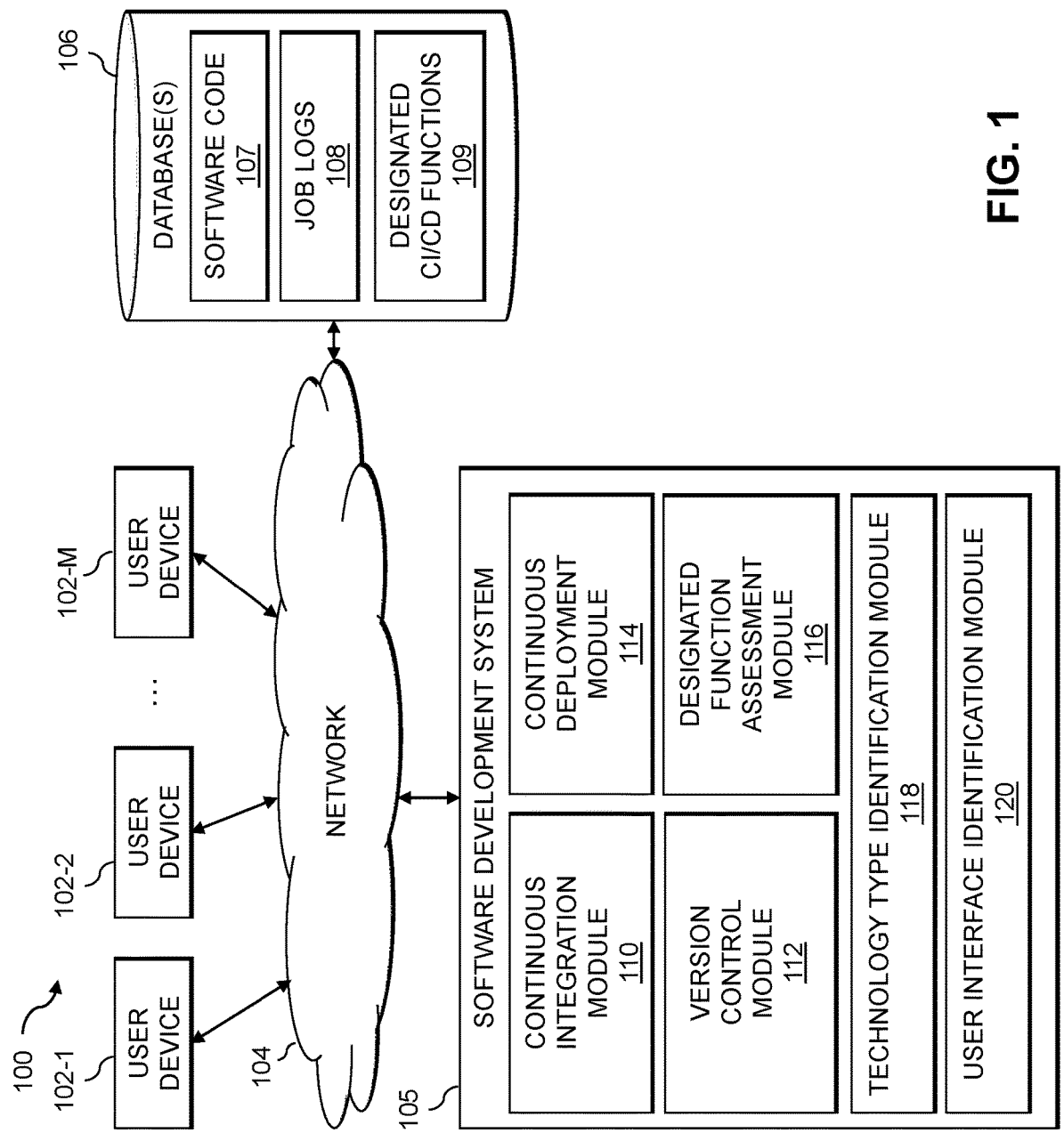
FIG. 1 illustrates an information processing system configured for software deployment pipeline evaluation using a presence of designated functions, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for software deployment pipeline evaluation using a presence of designated functions.

The term DevOps generally refers to a set of practices that combines software development and information technology (IT) operations. DevOps are increasingly being used to shorten the software deployment pipeline and to provide continuous integration, continuous delivery, and continuous deployment. Continuous integration (CI) generally allows development teams to merge and verify changes more often by automating software generation (e.g., converting source code files into standalone software components that can be executed on a computing device) and software tests, so that errors can be detected and resolved early. Continuous delivery extends continuous integration and includes efficiently and safely deploying the changes into testing and production environments. Continuous deployment (CD) allows code changes that pass an automated testing phase to be automatically released into the production environment, thus making the changes visible to end users. Such processes are typically executed within a software generation and deployment pipeline.

A software deployment pipeline (sometimes referred to as a CI/CD pipeline) automates a software development and delivery process, and typically comprises a set of automated processes and tools that allow developers and an operations team to work together to generate and deploy application software code to a production environment. The term "software deployment pipeline," as used herein, shall be broadly construed to encompass a process for development and/or deployment of application software code, as would be apparent to a person of ordinary skill in the art.

A given software deployment pipeline may comprise a specified set of elements and/or environments. Such elements and/or environments may be added or removed from the software deployment pipeline, for example, based at least in part on the software and/or compliance requirements. A software deployment pipeline typically comprises one or more quality control gates to ensure that software code does not get released to a production environment without satisfying a number of predefined testing and/or quality requirements. For example, a quality control gate may specify that software code should compile without errors and that all unit tests and functional user interface tests must pass.

One or more aspects of the disclosure recognize that there is an increasing trend to adopt a microservices architecture, for example, to achieve a faster time-to-market and to deliver solutions with higher quality, stability, and security at a lower cost. The most difficult part of transforming such applications to a microservices architecture, however, is understanding which parts of the development process need to be improved in order to see the benefits of those changes. The disclosed software deployment pipeline evaluation techniques enable a measurement of a maturity of the development process and create a standard for measuring application maturity.

In one or more embodiments, the disclosed software deployment pipeline evaluation techniques provide an automation standard that defines a set of designated functions (e.g., a set of recommended functions based on CI/CD best practices) for one or more stages of a software deployment pipeline. Software deployment pipelines (or portions thereof) are evaluated in at least some embodiments to: identify one or more designated functions executed by a respective software deployment pipeline, evaluate the identified executed functions against the applicable set of designated functions, and/or identify one or more missing designated functions to improve a maturity of the software deployment pipeline. For example, the disclosed software deployment pipeline evaluation techniques may assess the maturity of a given software deployment pipeline by evaluating: whether one or more of the designated functions are executed by the given software deployment pipeline, whether the executed designated functions succeeded, and/or whether the given software deployment pipeline executes the set of designated functions in an expected order.

In some embodiments, a DevOps maturity scorecard is provided that quantifies the maturity of a given software deployment pipeline based on the evaluation. A set of designated functions may be specified in some embodiments for each of a plurality of technology types. The software code and/or the logs of a given software deployment pipeline may be evaluated using the disclosed software deployment pipeline evaluation techniques to identify the one or more designated functions executed by the given software deployment pipeline and to evaluate whether such executed designated functions succeeded.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 may be employed, for example, by software developers and other DevOps professionals to perform, for example, software development and/or software deployment tasks. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a software development system 105.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The software development system 105 comprises a continuous integration module 110, a version control module 112, a continuous deployment module 114, a designated function assessment module 116, one or more technology type identification modules 118 and a user interface identification module 120. Exemplary processes utilizing elements 110, 112, 114, 116, 118 and/or 120 will be described in more detail with reference to, for example, the flow diagrams of FIGS. 2 through 5 and 7.

In at least some embodiments, the continuous integration module 110, the version control module 112 and/or the continuous deployment module 114, or portions thereof, may be implemented using functionality provided, for example, by a Git-based DevOps and/or CI/CD tool. The continuous integration module 110, the version control module 112 and the continuous deployment module 114 may be configured, for example, to perform CI/CD tasks and to provide access to DevOps tools and/or repositories. The continuous integration module 110 provides functionality for automating the integration of software code changes from multiple software developers or other DevOps professionals into a single software project.

In one or more embodiments, the version control module 112 manages canonical schemas (e.g., blueprints, job templates, and software scripts for jobs) and other aspects of the repository composition available from the DevOps and/or CI/CD tool. Source code management (SCM) techniques may be used to track modifications to a source code repository. In some embodiments, SCM techniques are employed to track a history of changes to a software code base and to resolve conflicts when merging updates from multiple software developers.

The continuous deployment module 114 manages the automatic release of software code changes made by one or more software developers from a software repository to a production environment, for example, after validating the stages of production have been completed. The continuous deployment module 114 may interact in some embodiments with the designated function assessment module 116 to resolve one or more errors in a software deployment pipeline and/or to verify a successful testing of a software deployment pipeline.

In at least some embodiments, the designated function assessment module 116 may implement at least portions of the disclosed techniques for software deployment pipeline evaluation using a presence of designated functions, as discussed further below in conjunction with, for example, FIGS. 2 through 5 and 7.

In one or more embodiments, the one or more technology type identification modules 118 are used by the designated function assessment module 116 to identify a technology type associated with a given software deployment pipeline, as discussed herein. The user interface identification module 120 determines whether a given software deployment pipeline is associated with a web application, for example, and whether the web application comprises a user interface, as discussed further below. In some embodiments, when a web application is determined by the user interface identification module 120 to comprise a user interface, a dynamic application scan function is added as a designated function to the set of designated functions for a non-production deployment and validation stage.

It is to be appreciated that this particular arrangement of elements 110, 112, 114, 116, 118 and/or 120 illustrated in the software development system 105 of the FIG. 1 embodiment is presented by way of example only, and alternative arrangements can be used in other embodiments. For example, the functionality associated with the elements 110, 112, 114, 116, 118 and/or 120 in other embodiments can be combined into a single module, or separated across a larger number of modules. As another example, multiple distinct processors can be used to implement different ones of the elements 110, 112, 114, 116, 118 and/or 120 or portions thereof.

At least portions of elements 110, 112, 114, 116, 118 and/or 120 may be implemented at least in part in the form of software that is stored in memory and executed by a processor.

Additionally, the software development system 105 can have at least one associated database 106 configured to store data pertaining to, for example, software code 107 of at least one application, one or more job logs 108 and a library identifying one or more designated CI/CD functions 109 for one or more software deployment pipelines. For example, at least a portion of the at least one associated database 106 may correspond to at least one code repository that stores the software code 107. In such an example, the at least one code repository may include different snapshots or versions of the software code 107, at least some of which can correspond to different branches of the software code 107 used for different development environments (e.g., one or more testing environments, one or more staging environments, and/or one or more production environments). As another example, such a database can maintain a particular branch of the software code 107 that is developed in a sandbox environment associated with a given one of the user devices 102, as discussed further below in conjunction with FIG. 3. Any changes associated with that particular branch can then be sent and merged with branches of the software code 107 maintained in the at least one database 106, for example. The job logs 108 may provide information characterizing an execution of one or more pipeline jobs of a software deployment pipeline. The designated CI/CD functions 109 may be designated for software deployment pipelines of a given technology type (e.g., cloud native, database, mobile, library and traditional technology types).

An example database 106, such as depicted in the present embodiment, can be implemented using one or more storage systems associated with the software development system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the user devices 102 and/or the software development system 105 are one or more input-output devices, which illustratively comprise keyboards, displays or other types of input-output devices in any combination. Such input-output devices can be used, for example, to support one or more user interfaces to the software development system 105, as well as to support communication between software development system 105 and other related systems and devices not explicitly shown.

Additionally, the software development system 105 in the FIG. 1 embodiment is assumed to be implemented using at least one processing device. Each such processing device generally comprises at least one processor and an associated memory, and implements one or more functional modules for controlling certain features of the software development system 105.

More particularly, the software development system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the software development system 105 to communicate over the network 104 with the user devices 102, and illustratively comprises one or more conventional transceivers.

It is to be understood that the particular set of elements shown in FIG. 1 for software development system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development system 105 and database(s) 106 can be on and/or part of the same processing platform.

Figure 2:
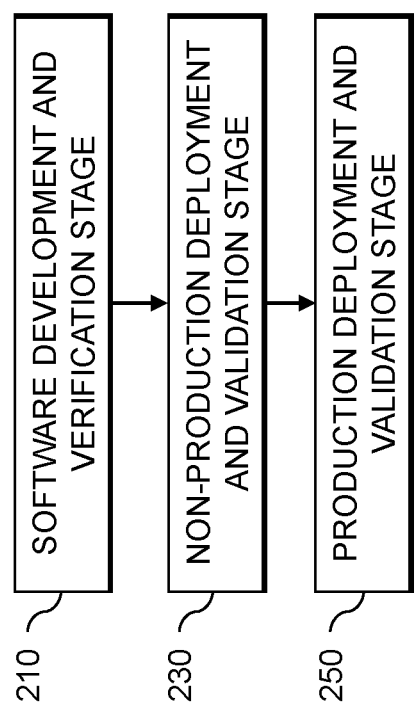
FIG. 2 shows an example of a software deployment pipeline in an illustrative embodiment.

FIG. 2 shows an example of a software deployment pipeline in an illustrative embodiment. A software deployment pipeline is comprised of a number of stages 210, 230 and 250. In the example of FIG. 2, a software development and verification stage 210 comprises generating (e.g., writing) and verifying the software code for a given application. In some embodiments, the disclosed software deployment pipeline evaluation techniques evaluate the software development and verification stage 210 to ensure that the software code can be generated using automation and that the appropriate testing, quality and security standards have been met. The verification standard of the software development and verification stage 210 requires, in one or more embodiments, the code to be unit tested, code quality tested, and security tested and that the automated jobs that perform such validation functions are gated (e.g., gated jobs ensure that if a given job fails, the software deployment pipeline will stop). In this manner, the generated software code meets the quality and security standards before the generated software code is deployed for testing. The security requirements of the software development and verification stage 210 ensure that the vulnerable attack surfaces of the generated software code are covered by security testing. In some embodiments, the security standard requires static application security testing (SAST), artifact vulnerability scanning, and third-party code scanning.

A non-production deployment and validation software testing stage 230 deploys the application software code to a non-production environment and validates the deployment. In some embodiments, the disclosed software deployment pipeline evaluation techniques evaluate the non-production deployment and validation software testing stage 230 to ensure that the software code can be deployed using automation and that the deployment was validated using a gated job automation. In addition, applications that provide a user interface are tested using a dynamic application security test (DAST) (e.g., because the user interface may introduce an additional vulnerable attack surface). The steps to validate a deployment in a non-production environment may be specified based on the needs of a given organization. For example, image security scanning tools may be employed to ensure a quality of the deployed images by comparing them to known vulnerabilities, such as those known vulnerabilities in a catalog of common vulnerabilities and exposures (CVEs), as discussed further below.

Finally, a production deployment and validation stage 250 comprises deploying the application software code to a production environment and validating the deployment. The steps to validate a deployment in a production environment may also be specified based on the needs of the given organization, in a similar manner as the non-production stage. In some embodiments, the disclosed software deployment pipeline evaluation techniques evaluate the production deployment and validation stage 250 to ensure that the production deployment is automated, that the application experiences zero-downtime during the deployment, and that the deployment was validated using gated job automation. In addition, change management automation may also be measured to ensure that a request for change (RFC) is created prior to the deployment, updated after the deployment, and closed after verifying the deployment. The disclosed software deployment pipeline evaluation techniques can integrate identification of such RFCs across multiple Software-as-a-Service (SaaS) tools that support an RFC ticketing system.

In one or more embodiments, a software deployment pipeline can comprise one or more of the following elements: (i) local development environments (e.g., the computers of individual developers); (ii) a CI server (or a development server); (iii) one or more test servers (e.g., for functional user interface testing of the product); and (iv) a production environment. The pipelines may be defined, for example, in YAML (Yet Another Markup Language) with a set of commands executed in series to perform the necessary activities (e.g., the steps of each pipeline job).

Figure 3:
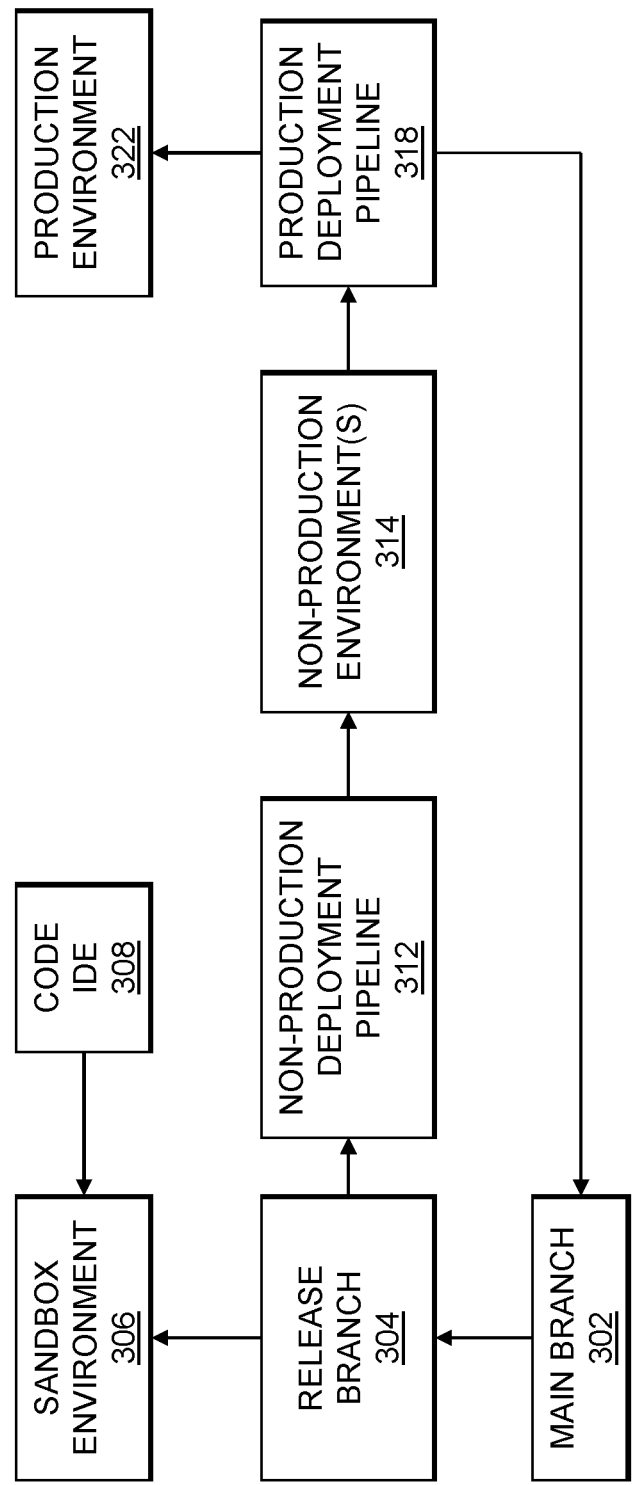
FIG. 3 shows an example of at least portions of the software deployment pipeline of FIG. 2 in further detail, in accordance with an illustrative embodiment.

FIG. 3 shows an example of at least portions of the software deployment pipeline of FIG. 2 in further detail in an illustrative embodiment. In the FIG. 3 example, a main branch 302 corresponds to software code of at least one software application. A release branch 304 is created based on the main branch 302. For example, the release branch 304 may be created based on development release timelines corresponding to the software application.

One or more developers (e.g., corresponding to user devices 102) create respective personal branches based on the release branch 304, and perform development work using a sandbox environment 306 and a code IDE (integration development environment) 308. Many developers prefer to write software code using such an IDE that allows the software to be developed in any programming language without having to deal with a particular language syntax. Developers may have multiple IDEs available for application development but there is currently no IDE available for writing software deployment pipeline code.

Developers can commit the changes made in their personal branches to the release branch 304. In the FIG. 3 example, a non-production deployment pipeline 312 is triggered according to one or more specified schedules. The non-production deployment pipeline 312 deploys any changes resulting from the change requests to one or more non-production environments 314.

In some examples, the non-production environment(s) 314 may include one or more of: a developer integration testing (DIT) environment, a system integration testing (SIT) environment, and a global environment. As noted above, the non-production deployment pipeline 312 may be triggered according to schedules defined for each of the non-production environments 314 (e.g., a first schedule for a DIT environment and a second schedule for an SIT environment).

A production deployment pipeline 318 can be triggered when the release branch 304 of the application is ready to be deployed to a production environment 322. Generally, the production deployment pipeline 318 collects any changes that were made to the release branch 304, creates a deployment package, and deploys the package to the production environment 322.

Figure 4:
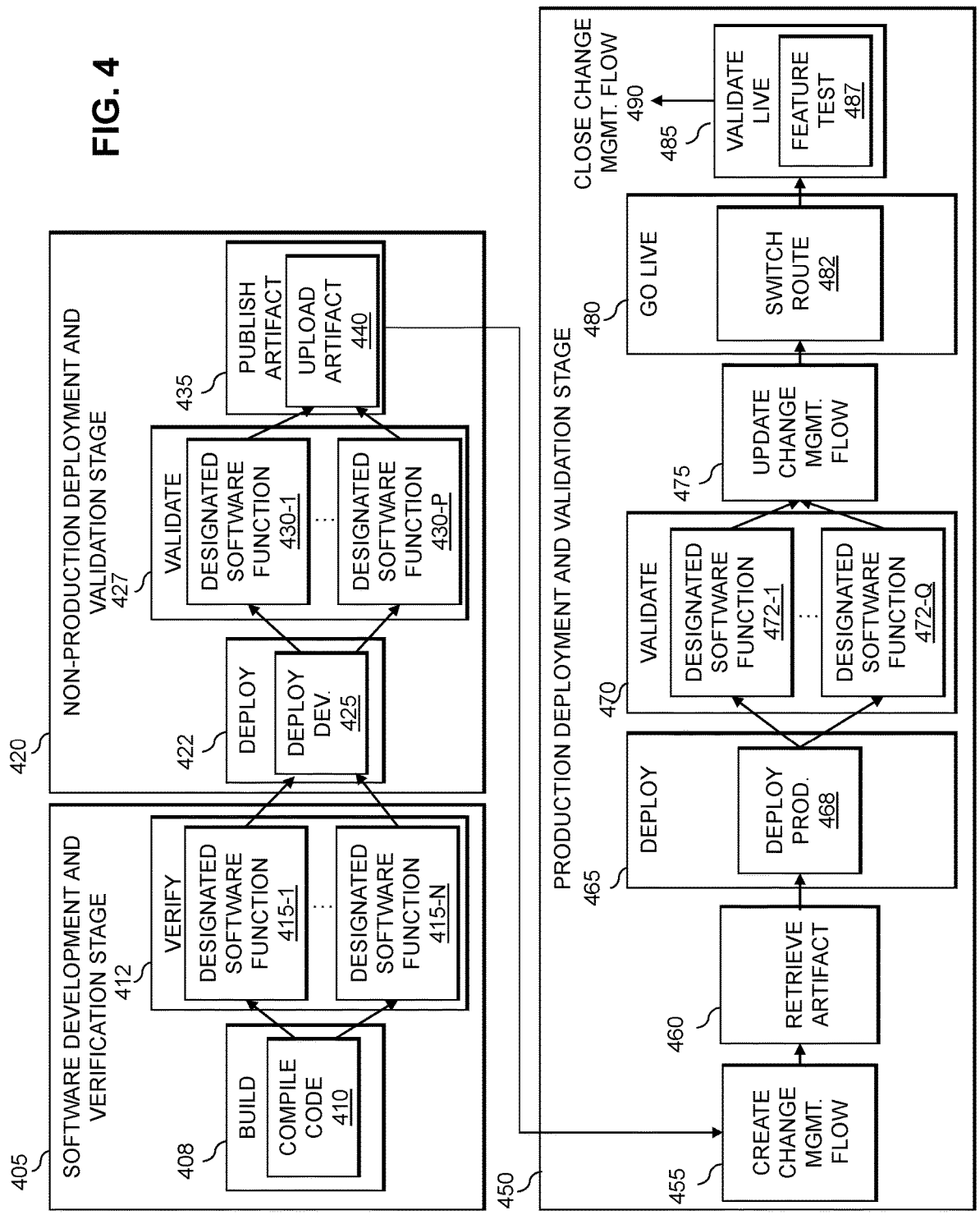
FIG. 4 illustrates a number of exemplary stages of a software deployment pipeline configured for software deployment pipeline evaluation using a presence of designated functions, in accordance with an illustrative embodiment.

FIG. 4 illustrates a number of exemplary stages of a software deployment pipeline, in accordance with an illustrative embodiment. In the example of FIG. 4, a software development and verification stage 405 comprises a build phase 408 and a verify phase 412. The build phase 408 comprises compiling 410 the software code associated with the build phase 408. The verify phase 412 comprises evaluating a set of designated software functions 415-1 through 415-N (collectively, referred to as designated software functions 415).

In one or more embodiments, the designated software functions 415 for the software development and verification stage 405 may comprise one or more of the following functions:

- a SCM function that ensures that the software code resides in a git-based repository to enable programmatic access to the software deployment pipelines and job logs so that an automated scoring process may be applied;
- an automated code build function that ensures that the software code is built using automation;
- an automated unit testing function that ensures that the software code is unit tested to ensure that the software code functions as expected;
- a code quality scan function that helps software developers align with coding standards that promote readability and maintainability of code;
- a static application security testing function that enables identification of security vulnerabilities in custom software code;
- a third-party code scan function that enables identification of vulnerabilities in open source and third-party code;
- an artifact vulnerability scan function that identifies vulnerabilities in artifacts (e.g., the compiled software code);
- a verify-build stage gated function that ensures that if one or more verification jobs applied in the verify phase 412 fail, the process is halted so that issues can be resolved and are not promoted to any testing environments; and
- a build artifacts managed function that ensures that the artifacts are maintained in an artifact management system so they can be deployed to any environment without requiring another build of the software code.

A non-production deployment and validation stage 420 comprises a deploy phase 422, a validate phase 427 and a publish artifact phase 435. The deploy phase 422 comprises deploying 425 the verified software code from the software development and verification stage 405 to the non-production environment. The validate phase 427 comprises evaluating a set of designated software functions 430-1 through 430-P (collectively, referred to as designated software functions 430). The publish artifact phase 435 comprises uploading 440 the validated artifact to the artifact management system (e.g., that maintains deployed software code).

In one or more embodiments, the designated software functions 430 for the non-production deployment and validation stage 420 may comprise one or more of the following functions:

- a non-production deployment function that ensures that the deployment is automated to maintain a consistent mechanism for delivering changes and to validate the software code before the software code is promoted to a production environment;
- a non-production deployment validation function that ensures that the software code is validated after deployment to ensure a functioning product;
- a dynamic application scan function the ensures that applications that provide a user interface capability are scanned dynamically to ensure that no vulnerabilities exist that would allow a user to compromise a system from a browser; and
- a non-production deployment validation stage gated function that ensures that if any validation jobs of the non-production deployment and validation stage 420 fail, the process is halted so that issues can be resolved and are not promoted to any testing environments.

A production deployment and validation stage 450 comprises a create change management workflow phase 455, a retrieve artifact phase 460, a deploy phase 465, a validate phase 470, an update change management workflow phase 475, a go live phase 480, a validate live phase 485 and a close change management workflow phase 490.

The create change management workflow phase 455 ensures that an RFC is created prior to the deployment. The retrieve artifact phase 460 retrieves the validated artifact from the artifact management system (e.g., that maintains deployed software code). The deploy phase 465 comprises deploying 468 the validated software code from the non-production deployment and validation stage 420 to the production environment. The deployment during the deploy phase 465 is repeated for each production datacenter. The deployed instances of an application may have a temporary name and may not immediately overwrite the production instance. The software deployment pipeline validates these temporary applications covering the production deployment in the validate phase 470. The validate phase 470 comprises evaluating a set of designated software functions 472-1 through 472-Q (collectively, referred to as designated software functions 472).

In one or more embodiments, the designated software functions 472 for the production deployment and validation stage 450 may comprise one or more of the following functions:

- a production deployment function that ensures that the deployment is automated to maintain a consistent mechanism for delivering changes;
- a zero-downtime deployment function that ensures that no downtime is experienced by a dependent service or user when a change is deployed for the application;
- a production deployment validation function that validates an application after deployment to ensure a functioning product before activating the functionality in a production environment;
- a validate production deployment stage gated function that ensures that if any validation jobs of the production deployment and validation stage 450 fail, the process is halted so that issues can be resolved and are not promoted to production environment;

a production deployment artifacts managed function that ensures that artifacts built and verified for quality and security are used for production deployment; and an RFC automated function that ensures that automation is enabled to create, update, and close RFC tickets so that changes are not impacted by manual intervention.

The update change management workflow phase 475 ensures that the RFC is updated after the deployment. After validating the temporary application instances successfully across the production datacenters in validate phase 470, the software deployment pipeline will then perform a go live phase 480 that removes the instances currently in production and renames the temporary instances to the default name by switching the route 482. The go live phase 480 is repeated for each production datacenter.

The validate live phase 485 performs a feature test 487 to validate the live version of the application. Finally, the RFC is updated and closed in the close change management workflow phase 490, completing the software deployment pipeline. The close change management workflow phase 490 ensures that the RFC is closed after verifying the deployment.

Figure 5:
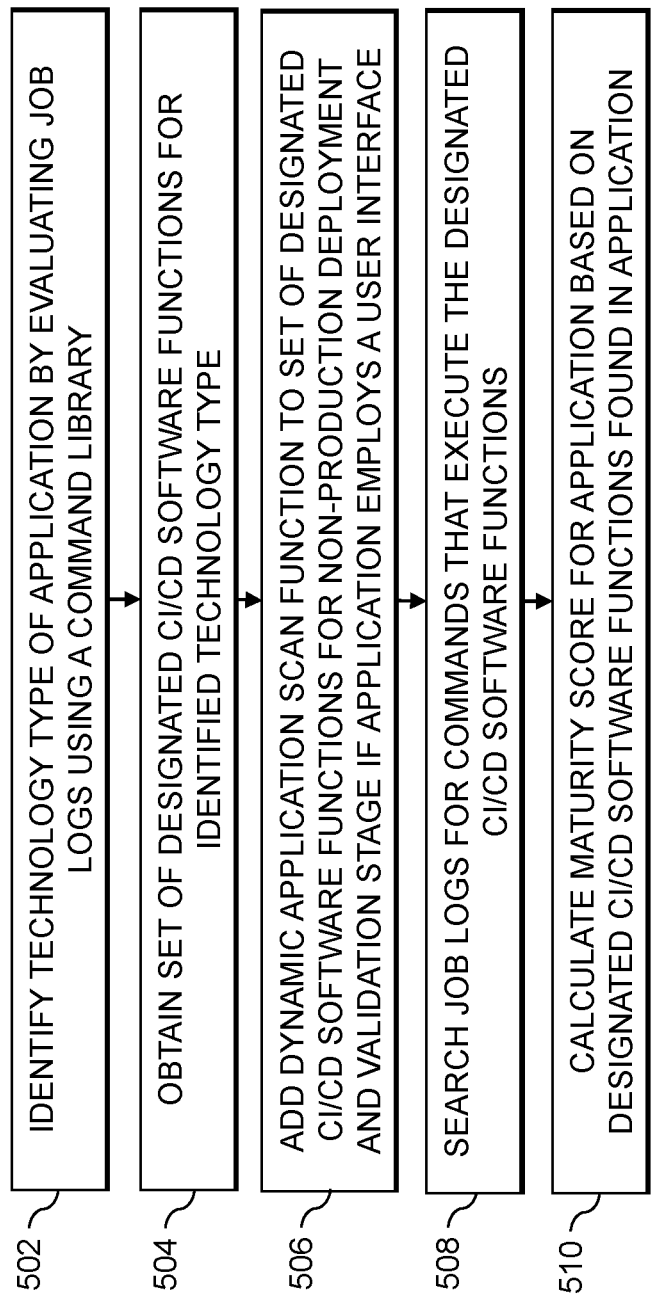
FIG. 5 is a flow chart illustrating an exemplary implementation of a process for software deployment pipeline evaluation using a presence of designated functions, in accordance with an illustrative embodiment.

FIG. 5 is a flow chart illustrating an exemplary implementation of a process for software deployment pipeline evaluation using a presence of designated functions, in accordance with an illustrative embodiment. In the example of FIG. 5, a technology type of a software deployment pipeline is identified in step 502 by evaluating (e.g., interrogating) one or more job log files associated with the software deployment pipeline using a command library. For example, the technology type may be identified by the commands and input parameters used when deploying the software code. A command library of deployment commands may be maintained in some embodiments to map particular commands to the technology type to automate the identification process.

In step 504, a set of designated CI/CD software functions for the identified technology type is obtained. The designated CI/CD functions may be based on best practices and/or other guidelines suggesting recommended functions for a given organization. In step 506, a dynamic application scan function is added to the set of designated CI/CD software functions for a non-production deployment and validation stage if a particular application employs a user interface. In some embodiments, the dynamic application scan function performs a security scanning because the web browser associated with the user interface may be used to exploit an existing vulnerability.

One or more aspects of the disclosure recognize that applications that provide user interface capabilities may have an additional vulnerable attack surface and that dynamic application scanning will provide coverage for such browser-based web applications. Further classification may be performed to identify application projects that provide user interface capabilities, so that such additional dynamic security requirements may be applied to the assessment. A query can be made to a git-based repository application programming interface (API), to retrieve a report of the programming languages used within that repository. The output of the query provides a list of the programming languages used and a percentage amount of that language used as compared to the other languages. An example programming language report may indicate that a particular software item may comprise 40% of HTML (hypertext markup language) code, 5% of CSS (cascading style sheets) code and 55% of Java code.

In some embodiments, the query results are processed using an equation or threshold to identify a web application. In one implementation, a project is classified as a web application when the project comprises more than 5% of web application code. A library of programming languages that can provide user interface capabilities may be created so that an automated process can compare the library against the repository language report. The library of web application languages may include HTML, CSS, ASP (Active Server Pages), ASP.NET that extends the .NET developer platform with tools and libraries specifically for building web applications, SCSS (sassy CSS, LESS (Leaner Style Sheets), Classic ASP, JavaScript, and Typescript.

It is noted that not all web applications provide a graphical user interface. Some web applications may offer various utility functions that are used by a graphical user interface. One example of a web application that provides a utility function is a database connection. It has been found that a web application that provides utility functions only will not include any of the following subset of programming languages HTML, CSS, ASP, ASP.NET, SCSS, LESS and Classic ASP. In some embodiments, web applications that employ a user interface may be assigned a classification that indicates that a given project is a web application and provides a user interface or is a micro front end component. Web applications that do not employ a user interface may be assigned a classification that indicates that the project is a web application that provides non-user interface functionality.

In step 508, job logs are searched for commands that execute the designated CI/CD software functions. One or more aspects of the disclosure recognize that the designated CI/CD software functions will have a unique command that will be present in the automated job logs that can be used to identify if the function has occurred. A library of function commands can be created to map the commands to the appropriate function so that an automated process can identify that the function was executed as part of the automated development process. The library of function commands can be used to identify each designated function of a development pipeline for multiple programming languages and technology types.

A maturity score may be calculated for a given application in step 510 based on the designated CI/CD software functions found in the given application (and optionally, whether such functions were successfully executed and/or executed in a particular order). In some embodiments, maturity scores may be presented, for example, in a single dashboard view for multiple applications, multiple software deployment pipelines and/or multiple projects. The maturity score for a particular application may be automatically updated in at least some embodiments each time the software deployment pipeline associated with the particular application is executed.

FIGS. 6A and 6B are sample tables 600-1, 600-2 illustrating a set of designated functions for a number of exemplary stages of a representative software deployment pipeline, in accordance with illustrative embodiments. In the example of FIGS. 6A and 6B various functions for each stage of a software deployment pipeline for a database technology type are listed with a corresponding indication of validate (indicating that the corresponding function is a designated function for the database technology type) or not applicable (N/A) (indicating that the corresponding function is not a designated function for the database technology type) for both a general database type and a business intelligence database type.

FIG. 6A comprises a sample table 600-1 that identifies the designated CI/CD software functions for the development and verification stage for the exemplary database technology type, from among the following representative CI/CD software functions: a source code management function; an automated code build function; an automated unit testing function; a code quality scan function; a static application security testing function; a third-party code scan function; an artifact vulnerability scan function; a verify-build stage gated function and a build artifacts managed function.

FIG. 6B comprises a sample table 600-2 that identifies the designated CI/CD software functions for the non-production deployment and validation and the production deployment and validation stages for an exemplary database technology type. The designated CI/CD software functions for the non-production deployment and validation stage are identified from among the following representative CI/CD software functions: an automated non-production deployment function; a non-production deployment validation function; a dynamic application scan function and a non-production deployment validation stage gated function.

The designated CI/CD software functions for the production deployment and validation stage are identified from among the following representative CI/CD software functions: an automated production deployment function; a zero-downtime deployment function; a production deployment validation function; a production deployment validation stage gated function; a production deployment artifacts management function; an RFC automated function.

FIG. 7 is a flow chart illustrating an exemplary implementation of a process for software deployment pipeline evaluation using a presence of designated functions, in accordance with an illustrative embodiment. In the example of FIG. 7, information characterizing a set of designated functions is obtained in step 702. In step 704, the process determines one or more of: (i) whether at least one stage of a given software deployment pipeline comprises one or more of the designated functions in the set and (ii) whether an execution of each of the one or more of the designated functions in the at least one stage of the given software deployment pipeline succeeded. One or more automated actions are initiated in step 706 based at least in part on at least one result of the determining.

In one or more embodiments, the obtaining the information characterizing the set of designated functions comprises identifying a technology type (e.g., a cloud native technology type, a database technology type, a mobile technology type, a library technology type or a traditional technology type) associated with the given software deployment pipeline and wherein the obtained set of designated functions is specified for the identified technology type. The determining whether the at least one stage of the given software deployment pipeline comprises the one or more of the designated functions may comprise searching one or more job logs associated with the at least one stage of the given software deployment pipeline for one or more commands that execute one or more of the designated functions.

In some embodiments, the one or more automated actions may comprise determining a score for the at least one stage of the given software deployment pipeline based at least in part on a number of the set of designated functions found in the at least one stage of the given software deployment pipeline. The one or more automated actions may comprise generating one or more notifications that identify one or more designated functions that one or more of: (i) are missing from the at least one stage of the given software deployment pipeline and (ii) have a failed status for the at least one stage of the given software deployment pipeline.

In at least one embodiment, the set of designated functions for the at least one stage of the given software deployment pipeline may be configured for a given organization. The set of designated functions for the at least one stage of the given software deployment pipeline may comprise one or more recommended functions based on a set of designated practices. An order of the execution of the one or more designated functions may be evaluated in the at least one stage of the given software deployment pipeline. An output of the execution of the one or more designated functions in the at least one stage of the given software deployment pipeline may be reviewed (e.g., logs produced by a designated function or a supporting system of the function, such as API endpoint or another log location) to verify whether the execution of the one or more designated functions succeeded.

In one or more embodiments, the determination of whether an execution of a given designated function succeeded may evaluate one or more success criteria defined for the given designated function. In this manner, different success criteria (e.g., success qualifications) may be defined for at least some of the designated functions. In some embodiments, the success (or failure) of an execution of a given designated function may be distinct from a success (or failure) of an execution of a job that calls the given designated function. Thus, the determination of whether an execution of a given designated function succeeded may be separately evaluated even when an execution of a job, that calls the given designated function, succeeded.

The particular processing operations and other network functionality described in conjunction with the flow diagrams of FIGS. 2 through 5 and 7, for example, are presented by way of illustrative example only, and should not be construed as limiting the scope of the disclosure in any way. Alternative embodiments can use other types of processing operations to provide functionality for software deployment pipeline evaluation using a presence of designated functions. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, an automation standard is provided that employs a set of designated functions for one or more stages of a software deployment pipeline. The software deployment pipelines (or portions thereof) are evaluated in some embodiments to identify designated functions executed by a respective software deployment pipeline (or portion thereof), to evaluate the identified executed functions against the applicable set of designated functions, and to identify one or more missing designated functions to improve a maturity of the software deployment pipeline. The maturity of a given software deployment pipeline may be assessed by evaluating whether one or more of the designated functions are executed by the given software deployment pipeline, whether the executed designated functions succeeded, and/or whether the given software deployment pipeline executes the set of designated functions in an expected order.

It should also be understood that the disclosed techniques for software deployment pipeline evaluation using a presence of designated functions can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed software deployment pipeline evaluation techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based software deployment pipeline evaluation engine, or portions thereof, are illustratively implemented for use by tenants of such a multi-tenant environment.

Cloud infrastructure as disclosed herein can include cloud-based systems. Virtual machines provided in such systems can be used to implement at least portions of a software deployment pipeline evaluation platform in illustrative embodiments. The cloud-based systems can include object stores.

In some embodiments, the cloud infrastructure additionally or alternatively comprises a plurality of containers implemented using container host devices. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
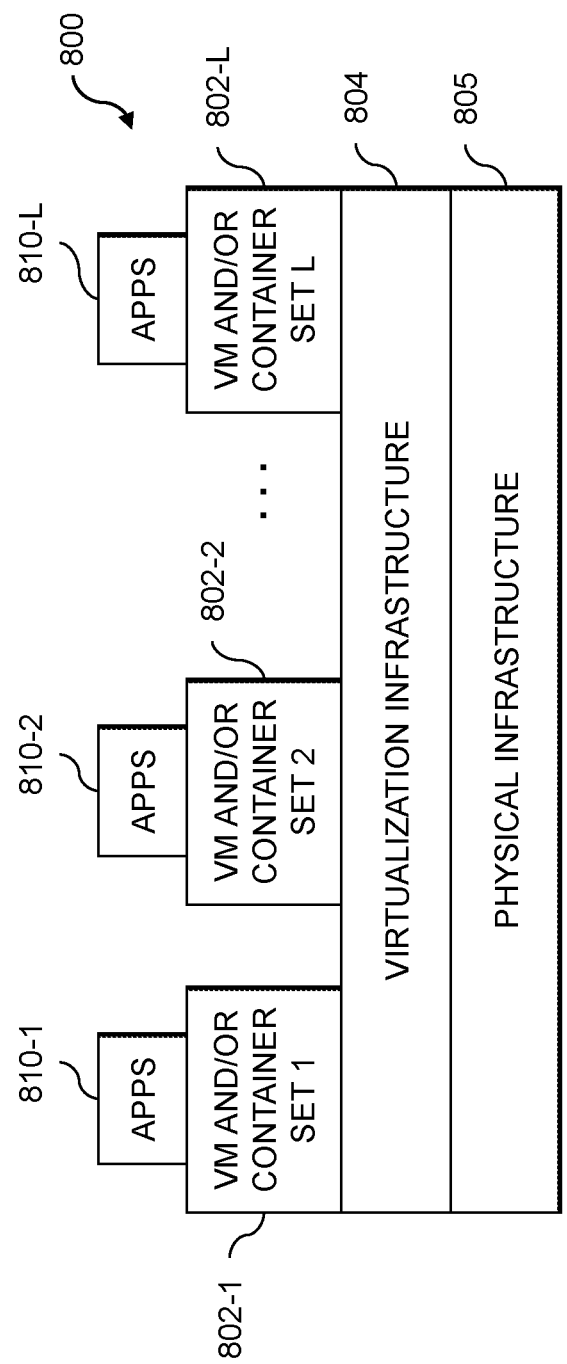
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple VMs and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide software deployment pipeline evaluation functionality of the type described above for one or more processes running on a given one of the VMs. Each of the VMs may implement software deployment pipeline evaluation control logic and associated software deployment pipeline recommendation functionality, for example, for one or more processes running on that particular VM.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide software deployment pipeline evaluation functionality of the type described above for one or more processes running on different ones of the containers. A container host device supporting multiple containers of one or more container sets can implement one or more instances of software deployment pipeline evaluation control logic and associated software deployment pipeline recommendation functionality, for example.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
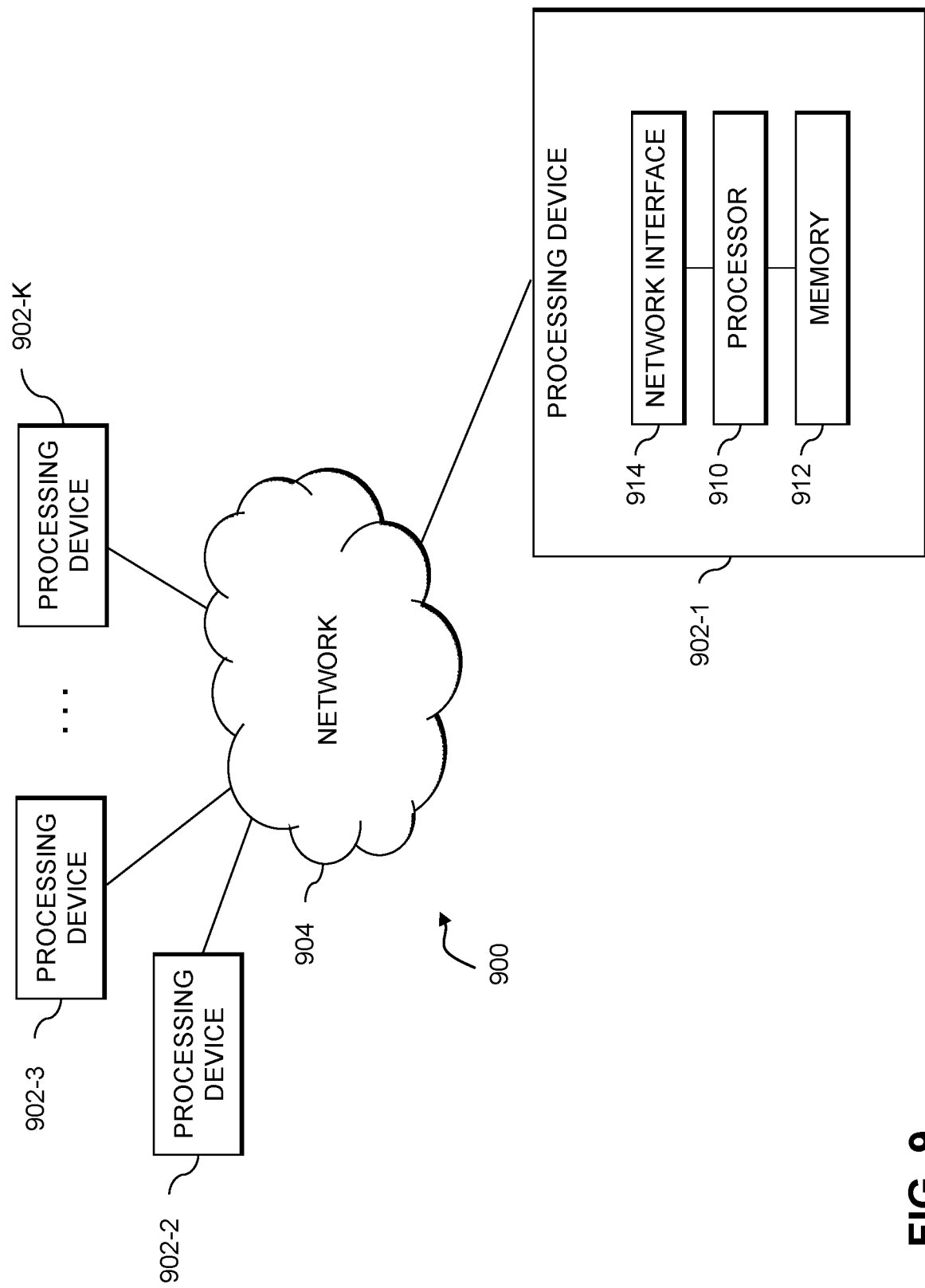
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining information characterizing a set of designated functions;
   determining whether at least one stage of a given software deployment pipeline comprises one or more of the designated functions in the set, wherein the determining comprises searching one or more job logs associated with the at least one stage of the given software deployment pipeline for one or more commands that execute one or more of the designated functions; and
   initiating one or more automated actions based at least in part on at least one result of the determining;
   wherein the method is performed by at least one processing device comprising a processor coupled to a memory.

2. The method of claim 1, wherein the obtaining the information characterizing the set of designated functions comprises identifying a technology type associated with the given software deployment pipeline and wherein the set of designated functions is specified for the identified technology type.

3. The method of claim 1, wherein the one or more automated actions comprise one or more of (i) determining a score for the at least one stage of the given software deployment pipeline based at least in part on a number of the set of designated functions found in the at least one stage of the given software deployment pipeline and (ii) generating one or more notifications that identify one or more designated functions that one or more of: (a) are missing from the at least one stage of the given software deployment pipeline and (b) have a failed status for the at least one stage of the given software deployment pipeline.

4. The method of claim 1, wherein the set of designated functions for the at least one stage of the given software deployment pipeline is configured for a given organization.

5. The method of claim 1, wherein the set of designated functions for the at least one stage of the given software deployment pipeline comprises one or more recommended functions based on a set of designated practices.

6. The method of claim 1, wherein the at least one stage of the given software deployment pipeline comprises a software development and verification stage and wherein the set of designated functions comprises one or more of: a function that determines whether source code for the given software deployment pipeline resides in a git-based repository; a function that determines whether the source code for the given software deployment pipeline was developed using automation; a function that performs one or more unit tests on the given software deployment pipeline; a function that performs a code quality scan on the source code for the given software deployment pipeline; a function that applies one or more static application security tests on the source code for the given software deployment pipeline; a function that applies one or more third-party code scans on the source code for the given software deployment pipeline; a function that identifies one or more vulnerabilities in artifacts associated with the given software deployment pipeline; a function that ensures that if one or more verification jobs associated with the given software deployment pipeline fail then the given software deployment pipeline is not promoted to a testing environment; and a function that determines whether one or more build artifacts associated with the given software deployment pipeline resides in an artifact management system.

7. The method of claim 1, wherein the at least one stage of the given software deployment pipeline comprises a non-production deployment and validation stage and wherein the set of designated functions comprises one or more of: a function that determines whether a deployment of at least a portion of the given software deployment pipeline is automated; a function that ensures that a deployment of at least a portion of the given software deployment pipeline is validated after the deployment; and a function that ensures that if one or more validation jobs associated with the given software deployment pipeline fail then the given software deployment pipeline is not promoted to a testing environment.

8. The method of claim 7, further comprising adding a dynamic application scan function to the set of designated functions for the non-production deployment and validation stage in response to the given software deployment pipeline employing a user interface.

9. The method of claim 1, wherein the at least one stage of the given software deployment pipeline comprises a production deployment and validation stage and wherein the set of designated functions comprises one or more of: a function that determines whether a deployment of at least a portion of the given software deployment pipeline is automated; a function that ensures that downtime is not experienced by a service or user when a change is deployed for the given software deployment pipeline; a function that ensures that a deployment of at least a portion of the given software deployment pipeline is validated after the deployment; a function that ensures that if one or more validation jobs associated with the given software deployment pipeline fail then the given software deployment pipeline is not promoted to a testing environment; a function that determines whether one or more build artifacts associated with the given software deployment pipeline resides in an artifact management system; and a function that ensures that the given software deployment pipeline automates one or more of creating, updating and closing of change tickets.

10. The method of claim 1, further comprising evaluating a maturity of the given software deployment pipeline based at least in part on the determining whether the at least one stage of the given software deployment pipeline comprises one or more of the designated functions in the set.

11. The method of claim 1, wherein the determining further comprises determining whether an execution of one or more of the designated functions in the at least one stage of the given software deployment pipeline succeeded.

12. The method of claim 11, further comprising evaluating an order of the execution of the one or more designated functions in the at least one stage of the given software deployment pipeline.

13. The method of claim 11, further comprising reviewing an output of the execution of the one or more designated functions in the at least one stage of the given software deployment pipeline to verify whether the execution of the one or more designated functions succeeded.

14. An apparatus comprising:
at least one processing device comprising a processor coupled to a memory;
the at least one processing device being configured to implement the following steps:
obtaining information characterizing a set of designated functions;
determining whether at least one stage of a given software deployment pipeline comprises one or more of the designated functions in the set, wherein the determining comprises searching one or more job logs associated with the at least one stage of the given software deployment pipeline for one or more commands that execute one or more of the designated functions; and
initiating one or more automated actions based at least in part on at least one result of the determining.

15. The apparatus of claim 14, wherein the one or more automated actions comprise one or more of (i) determining a score for the at least one stage of the given software deployment pipeline based at least in part on a number of the set of designated functions found in the at least one stage of the given software deployment pipeline and (ii) generating one or more notifications that identify one or more designated functions that one or more of: (a) are missing from the at least one stage of the given software deployment pipeline and (b) have a failed status for the at least one stage of the given software deployment pipeline.

16. The apparatus of claim 14, wherein the determining further comprises determining whether an execution of one or more of the designated functions in the at least one stage of the given software deployment pipeline succeeded and further comprising evaluating an order of the execution of the one or more designated functions in the at least one stage of the given software deployment pipeline.

17. A non-transitory processor-readable storage medium having stored therein program code of one or more software programs, wherein the program code when executed by at least one processing device causes the at least one processing device to perform the following steps:
obtaining information characterizing a set of designated functions;
determining whether at least one stage of a given software deployment pipeline comprises one or more of the designated functions in the set, wherein the determining comprises searching one or more job logs associated with the at least one stage of the given software deployment pipeline for one or more commands that execute one or more of the designated functions; and
initiating one or more automated actions based at least in part on at least one result of the determining.

18. The non-transitory processor-readable storage medium of claim 17, wherein the one or more automated actions comprise one or more of (i) determining a score for the at least one stage of the given software deployment pipeline based at least in part on a number of the set of designated functions found in the at least one stage of the given software deployment pipeline and (ii) generating one or more notifications that identify one or more designated functions that one or more of: (a) are missing from the at least one stage of the given software deployment pipeline and (b) have a failed status for the at least one stage of the given software deployment pipeline.

19. The non-transitory processor-readable storage medium of claim 17, wherein the determining further comprises determining whether an execution of one or more of the designated functions in the at least one stage of the given software deployment pipeline succeeded and further comprising evaluating an order of the execution of the one or more designated functions in the at least one stage of the given software deployment pipeline.

20. The non-transitory processor-readable storage medium of claim 17, further comprising evaluating a maturity of the given software deployment pipeline based at least in part on the determining whether the at least one stage of the given software deployment pipeline comprises one or more of the designated functions in the set.

* * * * *